United States Patent [19]
Coope

[11] Patent Number: 4,705,944
[45] Date of Patent: Nov. 10, 1987

[54] FORMATION DENSITY LOGGING WHILE DRILLING

[75] Inventor: Daniel F. Coope, Houston, Tex.

[73] Assignee: NL Industries, Inc., New York, N.Y.

[21] Appl. No.: 930,999

[22] Filed: Nov. 14, 1986

Related U.S. Application Data

[63] Continuation of Ser. No. 478,979, Mar. 25, 1983.

[51] Int. Cl.$^4$ .............................................. G01V 5/12
[52] U.S. Cl. ................................... 250/254; 250/262; 250/264; 250/266; 250/269
[58] Field of Search ............... 250/254, 269, 264, 265, 250/266, 262

[56] References Cited

U.S. PATENT DOCUMENTS

| | | | |
|---|---|---|---|
| 3,032,658 | 5/1962 | Youmans | 250/265 |
| 3,038,075 | 6/1962 | Youmans | 250/266 |
| 3,255,353 | 6/1966 | Scherbatskoy | 250/254 |
| 3,389,257 | 6/1968 | Caldwell et al. | 250/256 |
| 3,617,746 | 11/1972 | Janssen | 250/265 |
| 3,840,746 | 10/1974 | Kehler | 250/269 |
| 3,846,631 | 11/1974 | Kehler | 250/269 |
| 4,048,495 | 9/1977 | Ellis | 250/269 |
| 4,297,575 | 10/1981 | Smith, Jr. et al. | 250/266 |
| 4,596,926 | 6/1986 | Coope | 250/265 |

*Primary Examiner*—Carolyn E. Fields
*Attorney, Agent, or Firm*—Browning, Bushman, Zamecki & Anderson

[57] ABSTRACT

A gamma ray density sub and method useful for measurement-while-drilling applications utilizing a gamma ray source and detector located on the rotating sub and computation of the product of the counting rates obtained from at least three locations in the formation sample, the locations being located in a azimuthally symmetric pattern about the sub therefore indicating the average density location in the formation sample surrounding a borehole traversing an earth formation. The sub is able to measure the density of the sample, independent of the location of the sub within the borehole and the chemical composition of the interfering materials lying between the formation sample and the detectors.

15 Claims, 2 Drawing Figures

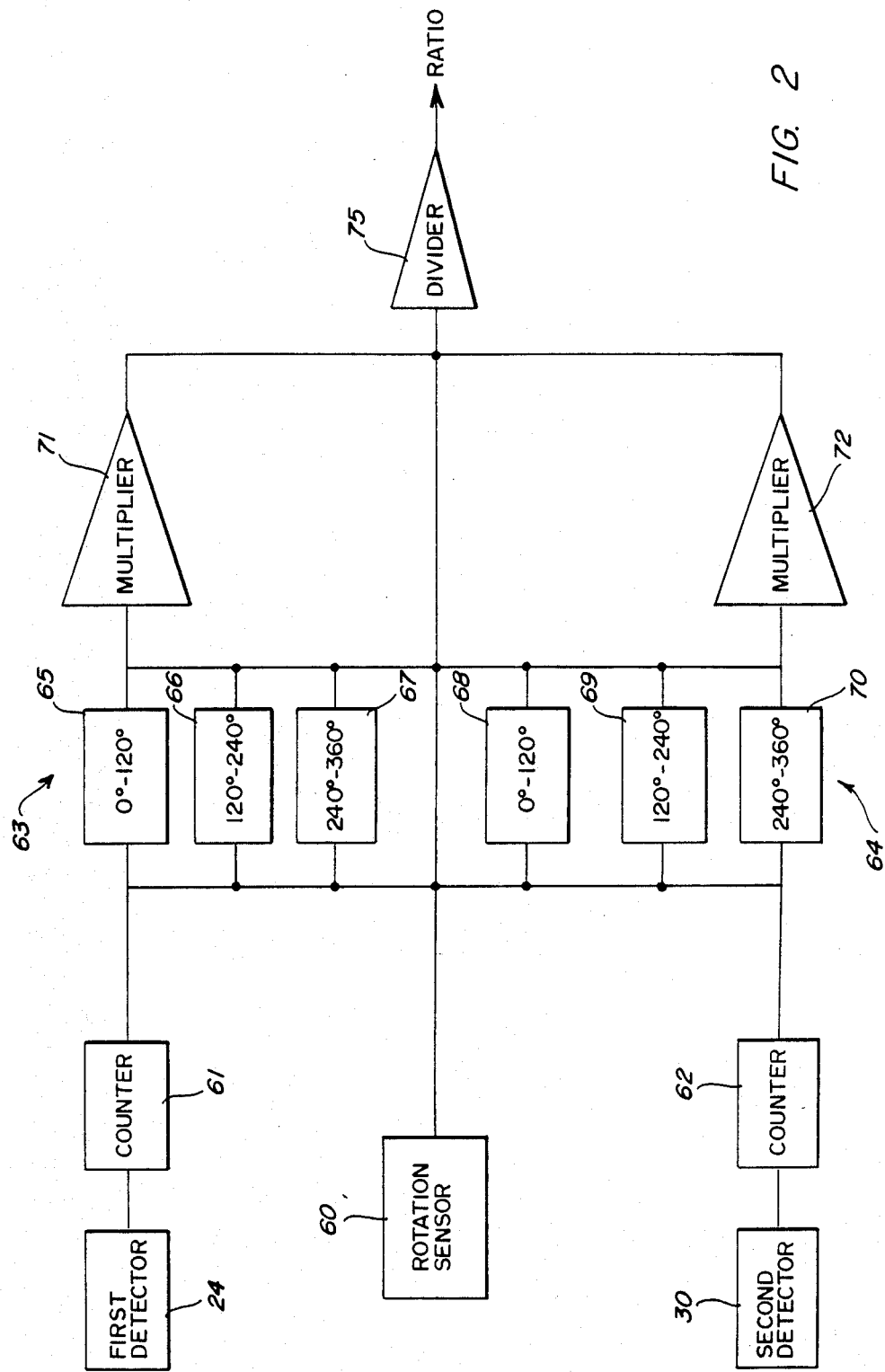

FORMATION DENSITY LOGGING WHILE DRILLING

This is a continuation of co-pending application Ser. No. 478,979 filed on Mar. 25, 1983.

BACKGROUND OF THE INVENTION

1. Field of the Invention

The present invention relates to logging of subterranean formations for determination of density using gamma rays. Particularly, this invention relates to determination of formation density while drilling a borehole traversing the earth formation.

2. Setting of the Invention

Wireline gamma ray density probes are devices incorporating a gamma ray source and a gamma ray detector, shielded from each other to prevent counting of radiation emitted directly from the source. During operation of the probe, gamma rays (or photons) emitted from the source enter the formation to be studied, and interact with the atomic electrons of the material of the formation by photoelectric absorption, by Compton scattering, or by pair production. In photoelectric absorption and pair production phenomena, the particular photons involved in the interacting are removed from the gamma ray beam.

In the Compton scattering process, the involved photon only loses some of its energy while changing its original direction of travel, the loss being a function of the scattering angle. Some of the photons emitted from the source into the sample are accordingly scattered toward the detector. Many scattered rays do not reach the detector, since their direction is changed by a second Compton scattering, or they are absorbed by the photoelectric absorption process of the pair production process. The scattered photons that reach the detector and interact with it, are counted by the electronic equipment associated with the detector.

The major difficulties encountered in conventional gamma ray density measurements include definition of the sample size, limited effective depth and sampling, disturbing effects of undesired, interfering materials located between the density probe and the sample and the requirement that the probe is positioned against the borehole wall. The chemical composition of the sample also affects the reading of conventional gamma ray density probes. This is complicated further when the density measurement tool is made part of a drilling string and operated during drilling operations. There are no known density probes useful in measurement while drilling apparatus.

Applicant's application filed Mar. 11, 1983, now U.S. Pat. No. 4,596,926, discloses and claims an apparatus and method for determining formation density which utilizes three gamma ray sources in a common plane and located symmetrically about the axis of the sub with a set of three near detectors and a set of three far detectors also in common planes, each detector being in axial alignment with one of the gamma ray sources. The counting rates received by the detectors as the drill string rotates are used to provide an indication of average density of the formation sample.

One prior art wireline density probe disclosed in U.S. Pat. No. 3,202,822 incorporates two gamma ray detectors, one collimated gamma ray source and ratio building electronic circuits, and is useful as long as the interfering materials, located between the detectors of the probe and the formation sample, are identical in thickness and chemical composition along the trajectories of emitted and received gamma ray. Non-uniformities in the wall of the borehole will interfere with the proper operation of the probe. Such non-uniformities can be caused by crooked holes, by cave-ins, and by varying thicknesses of the mudcake on the wall of the hole.

The prior art also includes U.S. Pat. No. 3,846,631 which discloses a wireline density probe that functions regardless of the thickness and the chemical composition of materials that are located between the density probe and the sample. The method comprises passing of two gamma ray beams from two intermittently operated gamma ray sources into the sample, receiving the radiation backscattered from each of the two sources by two separate detectors, and building ratios of products of the four separate counting rates in such a manner that the numerical result is an indication of the density of the sample.

The critical dimension of the two-detector probe is the spacing between the detectors. If the interferring materials are non-uniform over distances comparable to the spacing of the two detectors, the measured density will be erroneous.

Neither of the wireline probes described above is disclosed as being useful for measurement when drilling and incorporation into a rotating drill string.

SUMMARY OF THE INVENTION

It is a primary object of this invention to provide a method and apparatus for measuring the density of a subterranean formation while drilling a borehole traversing the formation.

This object and other objects are realized and the limitations of the prior art are overcome in the apparatus of the invention for logging the density of a formation surrounding a borehole traversing the formation, the apparatus adapted for use in a drill string including; a means for emitting gamma rays into the formation; a means for counting emitted gamma rays scattered from a sample in the formation back to the apparatus, the counting means producing I number of separate counts, each count being determined over a preselected period of time the periods being equal and commencing each $360°/I$ angle of rotation, wherein I is an integer equal to at least three; and a means for determining a product of the I number of counts, wherein the product is indicative of the average density of the formation sample.

The objects of this invention and other objects are realized further by the method of determining the average density of a formation sample of earth formation surrounding a borehole traversing the formation comprising rotating the device; emitting gamma rays into the formation determining I number counts of the emitted gamma rays scattered from a first formation sample back to the device, each count being determined over a preselected period of time and commencing each $360°/I$ angle of rotation, wherein I is an integer equal to at least three and determining a product of at least three counts, wherein the product is indicative of the average density of the first formation sample.

BRIEF DESCRIPTION OF THE DRAWING

Other features and intended advantages of the invention will be more readily apparent by reference to the following detailed description in connection with the accompanying drawing in which FIG. 2 is a block diagram representing the electronics required to process the scattered gamma rays.

Figure 1:
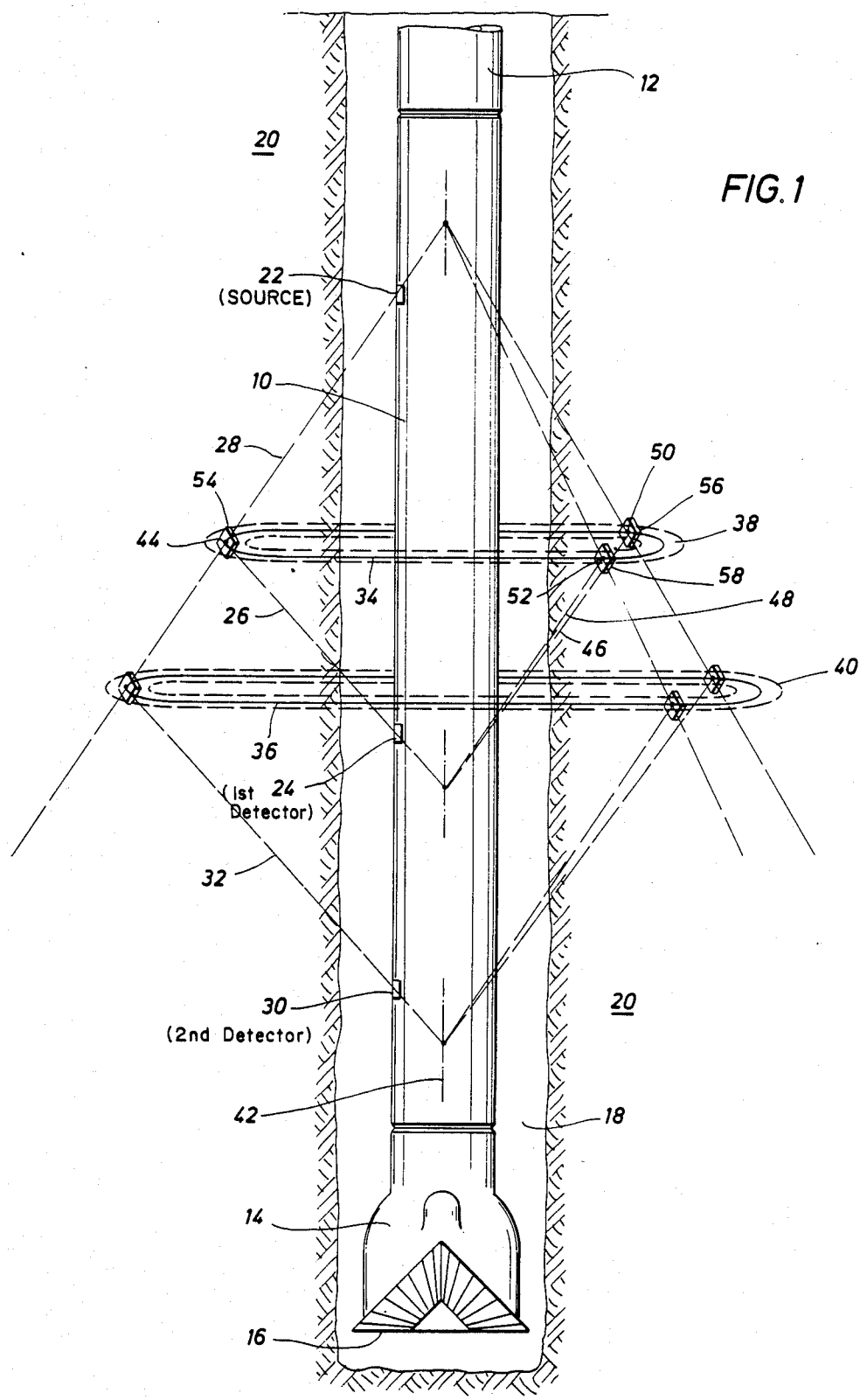
FIG. 1 is a cross-sectional representation of a device in accordance with the present invention for logging densities in a formation traversed by a rotating drill string, in which the device is located

While the invention will be described in connection with a presently preferred embodiment, it will be understood that it is not intended to limit the invention to the embodiment. On the contrary, it is intended to cover all alternatives, modifications and equivalents as may be included within the spirit of the invention as defined in the appended claims.

PREFERRED EMBODIMENT OF THE INVENTION

The gamma density sub 10 of this invention is shown in the drawing as interconnected between the upper drill string 12 and the lower drill string 14 which rotates thereby causing the drill bit 16 to form borehole 18 traversing earth formation 20.

The sub 10 includes a gamma ray source 22 and a first gamma ray detector 24. The first detector 24 is preferably situated on the sub 10 in azimuthal alignment with the source 22. The first detector 24 is collimated to receive gamma rays scattered from the formation along a trajectory 26 which intersects the trajectory 28 of the gamma rays emitted from the source 22.

The sub 10 may include a second gamma ray detector 30. This second detector 30 is preferably situated on the sub 10 in azimuthal alignment with the source 22, and the first detector 24. The second detector 30 will receive gamma rays along a trajectory 32 which intersects the trajectory 28 of the gamma rays emitted from the source. The trajectory 32 of the rays received by the second detector 30 should parallel the trajectory 26 of the received rays of the first detector 24.

The first and second detectors are shielded from the source to prevent the emitted gamma rays from reaching the detectors directly.

A first circle 34 is formed by the point of intersection of the trajectory 28 of the rays emitted by the source 22 and the trajectory 26 of the rays received by the first detector 24 as the sub 10 is rotated about its axis. A second circle 36 is formed by the point of intersection of the trajectory 28 of the rays emitted from the source 22 and the trajectory 32 of the rays received by the second detector 30 as the sub is rotated. The first circle 34 lies in a first formation sample 38 which is to be measured for density, and the second circle 36 lies in the second formation sample 40 which is to be measured for a compensated average.

In the method of this invention the sub 10 rotates about its axis 42 as gamma rays 28 are emitted into the sample by the source 22. The emitted collimated beams of gamma rays form a first cone-shaped region of formation which is irradiated.

In the formation 20, the emitted gamma rays 28 are scattered by the sample formation 38 at location 44 toward the first detector 24 and counted during a first collection time, $T_1$. Gamma rays 46 and 48 are scattered at locations 50 and 52 in formation sample 38 towards and received by the first detector 24 during second and third collecting times, $T_2$ and $T_3$ respectively.

Since there is only one collimated source 22, there is only one right conical region radiated during the sub's rotation. The collimated detector 24 receives scattered gamma rays 26, 46 and 48 from the formation sample 38 along trajectories forming a second cone, inverted with respect to the first cone and intersecting at the first circle 34.

The cones' thicknesses are determined by the diameter of the collimator for the source and first and second detectors. The first circle 34 formed by the intersection of the cones has as its center axis 42 of sub 10. In one rotation of the drill string, gamma rays from three small sectors 54, 56 and 58 of the formation sample 38, each 120° from the others, will be received by the detector 24 and sampled during collecting times $T_1$, $T_2$, and $T_3$.

Even though $T_1 = T_2 = T_3$, (the collecting times are equal) the count measurements during $T_1$, $T_2$ and $T_3$ may vary in magnitude due to the location of the sub and the intermediary material.

The individual counts from the first and second detectors for a respective collecting time may vary with time due to the sub's location within the borehole, as caused by rotation of the drill string, being off the axis of the borehole.

Counting of received gamma rays commences when the sub has rotated an incremented 360°/I degrees from a starting point and continues for a preselected period of time. Each measurement of counts for the preselected period of time is maintained separately. The I number of measurements for a given rotation are multipled to form a product, the product being indicative of the average density of the formation sample. The time periods are determined by the sensitivity of the receiver and the rate of emission of the source, such that the number of counts is representative of the rays scattered back from the formation.

The angle of rotation may be determined by conventional means. Additionally, and contemplated to be within this invention, the angle of rotation may be eliminated where the angular rotation rate is relatively constant. In such a case, the counting period would commence at time intervals spaced by the time of rotation divided by the I integer.

In the method of this invention, the at least three instantaneous counts from the first detector made during one rotation are multiplied thereby resulting in a constant value thus indicating elimination of variables with time between one rotation and subsequent rotations such as the thickness of mud through which the emitted gamma rays must pass to be received at the detectors and the movement of the sub in relation to the borehole wall.

The sub in an off axis position will receive gamma rays 26, 46 and 48 that have scattered from the formation sample 38 at detector 24 and which have traveled through a different amount of mud and formation. However, the sum of the path lengths through mud, and the sum of the path lengths through the formation are constant provided that the diameter of sub 10 is substantially similar to the diameter of borehole 18.

A density log for measurement while drilling applications should be accurate to within about 0.1 g/cm³. Since formation density is typically 2.5 g/cm³, an accuracy of better than 4% is required. If vertical resolution required for the log is 0.5 foot, a required counting rate may be estimated as follows:

$$\frac{\sigma}{N_1 N_2 N_3} \leq 0.01$$

where:

σ is the statistical variation of the produce $N_1N_2N_3$,
$N_1$ is the counting rate during time $T_1$,
$N_2$ is the counting rate during time $T_2$, and
$N_3$ is the counting rate during time $T_3$.
Assuming $N_1=N_2=N_3=N$, then (from the field of statistics) $\sigma^2=3N^5$ and $$\frac{\sigma}{N_1N_2N_3} = \frac{\sigma}{N^3} = \sqrt{\frac{3}{N}} \leq 0.01$$

Solving for N $N \geq 3.0 \times 10^4$ counts

Each density log measurement should detect an average of 30,000 counts per measurement and there should be at least one measurement every ½ foot. At 60 feet per hour drilling rate, each measurement will therefore be completed in 10 seconds, or less, since it must be completed in no more than ⅓ of a rotation.

Therefore, the first detector 24 and the second detector 30 if utilized for compensation purposes should have sufficient sensitivity such that about 1000 counts per second per detector are registered. Alternatively, the source may be adjusted to emit at a rate such that the detectors receive at the required rate of 1000 counts per second per detector.

Since the sub is rotating, each count measurement may be less than that required for a statistically accurate measurement of the formation density. One method of achieving accuracy, is to sum the products of each rotation until sufficient counts are obtained. The summation of products or ratios of products in the case of a compensated density does not result in an absolute density but is indicative of the density when correlated with prior measurements.

To compensate the average density for the formation sample 38, the method of this invention may include use of the counts from the second detector 30 during the at least three counting periods of one rotation of the drill string. The product of these at least three counts would be used to form a ratio between the product of the first detector 24 and the product of the second detector 30. Alternatively, the product of the three ratios of the first detector 24 to the second detector 30 may be used to determine the average compensated density.

A similar arrangement for the second detector 30 may be included in the sub 10 for receiving, discriminating, counting, storing and using the gamma rays received by the second detector.

In the compensated mode, i.e., using two detectors, the product of the counts detected by detectors 24 and 30, and the quotient of the products is produced using the electronics schematically shown in FIG. 2. Count storing devices 63 & 64 store the counts from counters 61 and 62 in three bins for each storage device; bins 65 and 68 storing counts from 0°-120°, 68 and 69 storing counts from 120°-240°, and 67 and 70 storing counts from 240°-360°.

The storage devices 63, 64 are designed to sort the counts into the three separate bins depending on the angular position of the sub 10 in the borehole 18 as indicated by angular position sensor 60. Every 360° of rotation of the sub 10, the storage devices 63 and 64 are cleared and begin to store during the next rotation of the sub 10. The multiplying devices 71 and 72 compute the products of the bins once every 360° at the completion of a rotation; multiplying device 71 computes the product of counts in bins 65, 66, and 67 and multiplying device 72 computes the product of counts in bins 68, 69, and 70. This is done when the rotation sensor signals a change at 360°. Furthermore, the dividing device 75 computes the quotient of the products produced by devices 71 and 72 once every 360° when the sub 10 completes one rotation.

In the uncompensated mode only one detector is utilized, therefore, no ratio is obtained, only the product of the count sets.

The type of the gamma ray source is not an object of the invention, since different types are preferred for different applications. Capsule type sources containing the radioactive isotopes such as cobalt 60 and cesium 137, are the gamma ray sources most frequently used in gamma ray density probes.

The diameters of the borehole and the sub 10 should be substantially equivalent. This can be accomplished by use of stabilizers on the exterior of the sub 10 which are then part of the relative diameter determination.

Various other alterations in the details of construction and the sequence of computations can be made without departing from the scope of the invention, which is indicated in the appended claims.

What is claimed:

1. A rotating device for use in a borehole traversing an earth formation comprising: a gamma ray emitting means, said means emitting a collimated gamma ray beam along a first trajectory, said beam intersecting a first circle located in a sample of said formation to be measured; a first gamma ray detecting means oriented to receive emitted gamma rays scattered from locations within said first circle; a means for counting said received gamma rays during I preselected periods of time, each period being equal and commencing each 360°/I of rotation, and wherein I is an integer which is at least three; and a means for determining a first product of the counts of gamma rays received by said first detecting means during said I time periods to provide an indication of the average density of said formation sample.

2. The device of claim 1 wherein said device is operable irrespective of the location of said device within said borehole.

3. The device of claim 1 wherein the diameter of said device is substantially equivalent to but smaller than the diameter of said borehole.

4. The device of claim 1 comprising additionally: a second detecting means oriented to receive emitted gamma rays scattered from locations within a second circle which is intersected by the trajectory of said emitted gamma rays; a means for determining a second product of the counts of gamma rays received by said second detecting means during said I preselected periods of time; and a means for determining the ratio of said first product divided by said second product to provide an indication of an average compensated density of said formation sample.

5. The device of claim 4 wherein the trajectory of the gamma rays received by said second detecting means is parallel to said trajectory of the gamma rays received by said first detector means.

6. A method of determining the average density of a formation sample surrounding a borehole being formed in said formation by a drill string which includes gamma ray emitting and detecting means comprising: rotating said drill string; emitting gamma rays into said formation; determining I sets of counts of said emitted gamma rays scattered from a first formation sample back to a first detecting means, each set being determined over a preselected period of time which comprises each 360°/I angle of rotation, and wherein I is an integer equal to at least three; and determining a first product of said at least three sets of counts to provide an indication of the average density of said first formation sample.

7. The method of claim 6 comprising additionally: determining I sets of counts of said emitted gamma rays scattered from a second formation sample back to a second detecting means, each set being determined during said time period corresponding to said I sets of counts for said first formation sample; determining a second product of said I sets of counts from said second detecting means; and determining the ratio of said first product divided by said second product to provide an indication of an average compensated density of said formation sample.

8. The method of claim 7 wherein the trajectories of rays scattered back from said first formation sample are parallel to the trajectories of rays scattered back from said second formation sample.

9. The method of claim 7 comprising additionally: collimating said second detecting means to receive only gamma rays scattered from said second sample.

10. The method of claim 6 wherein said method is accomplished without positioning said drill string in the geometric center of or in a fixed position within said borehole.

11. The method of claim 6 comprising additionally: collimating said rays emitted from said drill string to form a beam having a trajectory which intersects said first and second formation samples.

12. The method of claim 6 comprising additionally: collimating said first detecting means to receive only gamma rays scattered from said first sample.

13. Apparatus for use in a drill string for logging the density of a formation surrounding a borehole traversing said formation, comprising: a means for emitting gamma rays into said formation; a means for detecting and counting gamma rays scattered from a sample in said formation back to said apparatus, said counting means producing I number of separate sets of counts, each said count set being determined over a preselected period of time, each said period being equal and commencing each 360°/I angle of rotation, and wherein I is an integer equal to at least three; and a means for determining a first product of said I sets of counts to provide an indication of the average density of said formation sample.

14. The apparatus of claim 13 wherein said detecting means is oriented to detect scattered gamma rays along a trajectory intersecting said formation sample.

15. The apparatus of claim 13 wherein I is 3.

* * * * *